United States Patent
Pommier et al.

(10) Patent No.: US 11,518,715 B2
(45) Date of Patent: *Dec. 6, 2022

(54) COMPOSITIONS AND METHOD TO IMPROVE THE DURABILITY OF CALCIUM SILICATE-BASED CEMENTS AND CONCRETES

(71) Applicant: SOLIDIA TECHNOLOGIES, INC., Piscataway, NJ (US)

(72) Inventors: Guillaume Pommier, Jona (CH); Gilles Lecomte, Jona (CH); Bruno Huet, Jona (CH); Martin Mosquet, Jona (CH); Vincent Meyer, Jona (CH); Sadananda Sahu, Tallahassee, FL (US); Ahmet Cuneyt Tas, Piscataway, NJ (US); Deepak Ravikumar, Piscataway, NJ (US); Jason Elizan Bryant, Easton, PA (US); Anuj Seth, East Brunswick, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 1043 days.

This patent is subject to a terminal disclaimer.

(21) Appl. No.: 16/197,961

(22) Filed: Nov. 21, 2018

(65) Prior Publication Data
US 2019/0152857 A1 May 23, 2019

Related U.S. Application Data

(60) Provisional application No. 62/589,314, filed on Nov. 21, 2017.

(51) Int. Cl.
| | | |
|---|---|---|
| C04B 28/18 | (2006.01) | |
| C04B 24/08 | (2006.01) | |
| C04B 40/02 | (2006.01) | |
| B32B 13/04 | (2006.01) | |
| C04B 24/42 | (2006.01) | |
| C04B 111/27 | (2006.01) | |
| C04B 111/20 | (2006.01) | |

(52) U.S. Cl.
CPC ............ *C04B 28/188* (2013.01); *B32B 13/04* (2013.01); *C04B 24/08* (2013.01); *C04B 24/085* (2013.01); *C04B 24/42* (2013.01); *C04B 40/0231* (2013.01); *C04B 2111/27* (2013.01); *C04B 2111/29* (2013.01)

(58) Field of Classification Search
CPC ..... C04B 14/043; C04B 24/08; C04B 24/085; C04B 24/42; C04B 28/188; C04B 40/0231; C04B 2103/65; C04B 2111/27; C04B 2111/29; B32B 13/04; Y02P 40/18
See application file for complete search history.

(56) References Cited

U.S. PATENT DOCUMENTS

| | | |
|---|---|---|
| 8,114,367 B2 | 2/2012 | Riman et al. |
| 9,221,027 B2 | 12/2015 | Kuppler et al. |
| 2004/0107872 A1 | 6/2004 | Matsuyama et al. |
| 2009/0142578 A1 | 6/2009 | Riman et al. |
| 2009/0143211 A1 | 6/2009 | Riman et al. |
| 2011/0104469 A1 | 5/2011 | Riman et al. |
| 2012/0312194 A1 | 12/2012 | Riman et al. |
| 2013/0122267 A1 | 5/2013 | Riman et al. |
| 2014/0093659 A1 | 4/2014 | Riman et al. |
| 2014/0127450 A1 | 5/2014 | Riman et al. |
| 2014/0127458 A1 | 5/2014 | Zambrzycki et al. |
| 2014/0263683 A1 | 9/2014 | Krishnan et al. |
| 2014/0272216 A1 | 9/2014 | Deo et al. |
| 2014/0314990 A1 | 10/2014 | Henn et al. |
| 2014/0342124 A1 | 11/2014 | Zambrzycki et al. |
| 2014/0361471 A1 | 12/2014 | Hu et al. |
| 2014/0363665 A1 | 12/2014 | Kuppler et al. |
| 2015/0056437 A1 | 2/2015 | Deo et al. |
| 2015/0203408 A1 | 7/2015 | Sroka et al. |
| 2015/0225295 A1 | 8/2015 | McCandlish et al. |
| 2015/0266778 A1 | 9/2015 | Riman et al. |
| 2015/0336852 A1 | 11/2015 | Patten et al. |
| 2016/0031757 A1 | 2/2016 | Atakan et al. |
| 2016/0096773 A1 | 4/2016 | Quinn et al. |
| 2016/0168720 A1 | 6/2016 | Jain et al. |
| 2016/0272544 A1 | 9/2016 | Sahu et al. |
| 2016/0272545 A1 | 9/2016 | Atakan et al. |
| 2016/0340261 A1 | 11/2016 | Atakan et al. |
| 2016/0355439 A1 | 12/2016 | McCandlish et al. |
| 2017/0102373 A1 | 4/2017 | Atakan et al. |
| 2017/0121223 A1 | 5/2017 | Atakan |

(Continued)

FOREIGN PATENT DOCUMENTS

| | | | | |
|---|---|---|---|---|
| CN | 106007629 A | | 10/2006 | |
| CN | 106892624 A | * | 6/2017 | ............ C04B 28/04 |
| JP | 58020787 A | * | 2/1983 | ............ C04B 41/62 |
| JP | S63-210055 A | | 8/1988 | |
| JP | 2005-089283 A | | 4/2005 | |
| JP | 2005-187324 A | | 7/2005 | |
| WO | WO 2009/102360 A2 | | 8/2009 | |
| WO | WO 2011/053598 A1 | | 5/2011 | |
| WO | WO 2011/090967 A1 | | 7/2011 | |

OTHER PUBLICATIONS

International Search Report as issued in International Patent Application No. PCT/EP2018/082117, dated Feb. 5, 2019.

(Continued)

*Primary Examiner* — Anthony J Green
(74) *Attorney, Agent, or Firm* — Dentons US LLP

(57) ABSTRACT

Calcium silicate-based cements and concretes are disclosed, which result in concrete compositions that have an increased durability. A cement product includes a plurality of particles of a carbonatable calcium silicate cement and a hydrophobic organic acid, or a salt thereof, or a silane, or a polysiloxane.

8 Claims, 7 Drawing Sheets

(56) References Cited

U.S. PATENT DOCUMENTS

| | | |
|---|---|---|
| 2017/0204010 A1 | 7/2017 | Atakan |
| 2017/0253530 A1 | 9/2017 | Sahu et al. |
| 2017/0260096 A1 | 9/2017 | Sahu et al. |
| 2017/0320781 A1 | 11/2017 | Atakan et al. |
| 2017/0341989 A1 | 11/2017 | Jimenez et al. |
| 2018/0194693 A1 | 7/2018 | Quinn et al. |

OTHER PUBLICATIONS

Database WPI, Week 198841, Thomson Scientific, AN-1988-288670, XP002788143, (2017), 1 page.
U.S. Appl. No. 61/708,423, filed Oct. 1, 2012.

* cited by examiner

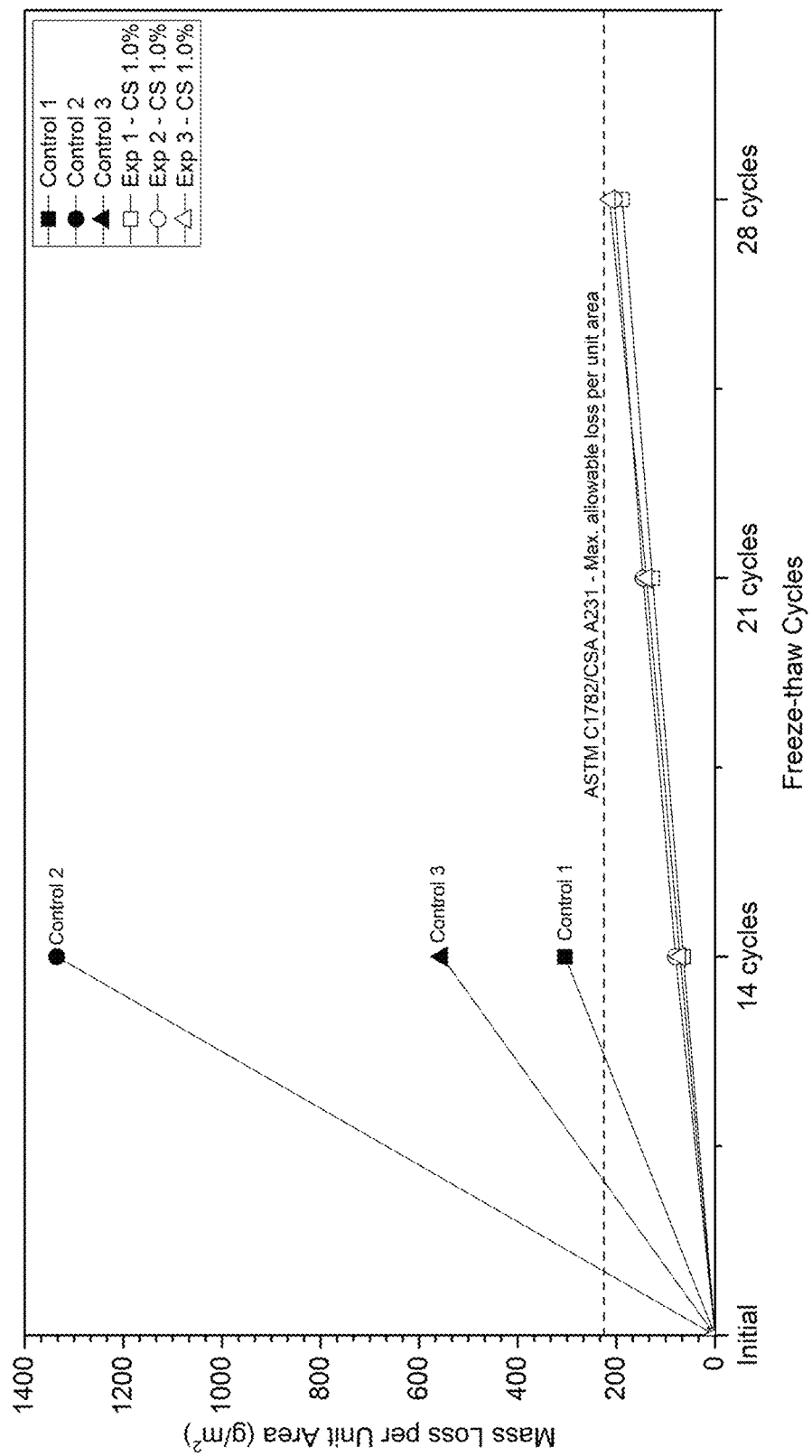

COMPOSITIONS AND METHOD TO IMPROVE THE DURABILITY OF CALCIUM SILICATE-BASED CEMENTS AND CONCRETES

CROSS-REFERENCE TO RELATED APPLICATIONS

This application claims priority to U.S. Provisional Patent Application No. 62/589,314, filed Nov. 21, 2017, the entire content of which is incorporated herein by reference in its entirety.

FIELD

The present invention relates to carbonatable calcium silicate-based cements and concretes, which result in concrete compositions that have an increased durability.

BACKGROUND

Concrete is the most consumed man-made material in the world. Precast concrete products, such as pavers, blocks, hollow core slabs, roof tiles, aerated concrete blocks, etc., are widely used in construction, pavements and landscaping, infrastructure and transportation.

A typical concrete product is made by mixing water and aggregates such as sand and crushed stone with Portland cement, a synthetic material made by burning a mixture of ground limestone and clay, or materials of similar composition in a rotary kiln at a sintering temperature of around 1,450° C. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cement and concrete products. Production of carbonatable calcium silicate-based cements and concrete products involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

However, even with these revolutionary forms of cements, users are always waiting for solutions to improve durability of concrete products.

BRIEF DESCRIPTION OF THE DRAWINGS

FIG. 9: Performance of carbonated Concrete pavers produced with (invention) and without (control) the addition of 1.0% calcium stearate during exposure to deicing salt and freeze-thaw cycling. (Example 3). Pavers of the invention produced with the addition of 1.0 wt. % calcium stearate (CS) show significant improvements in durability in comparison to control pavers produced without calcium stearate during exposure to deicing salt and freeze-thaw cycling.

DETAILED DESCRIPTION

Figure 1:
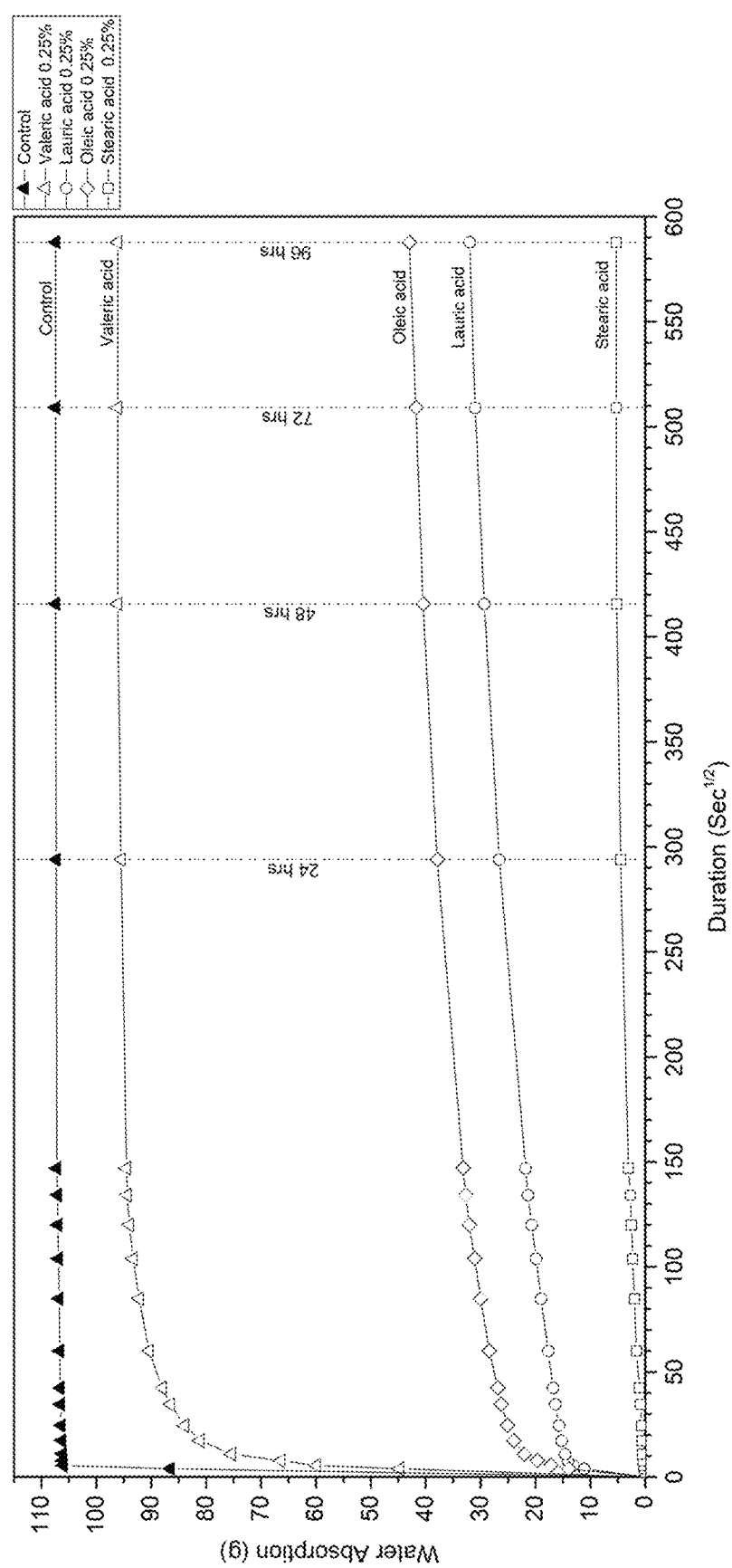
FIG. 1: Water absorption of mortar mixes containing no fatty acid (Control; ) or mortar mixes of the invention containing fatty acids representative of short carbon chain lengths (valeric acid, ), medium chain lengths (lauric acid, 12:0; ), and saturated (stearic acid, 18:0; ) or unsaturated (oleic acid, 18:1; ) long chain lengths. (Example 2). All mixes of the invention produced with fatty acids reduced the rate of water absorption relative to the control mix.

The invention provides novel compositions of carbonatable calcium silicate-based cements and concretes and methods for increasing durability of calcium silicate-based cements and concretes. These improvements are achieved through the use of specific additives, included during the preparation of the cement or the concrete compositions.

In one aspect, the invention relates to the calcium silicate-based cement compositions. As used herein, the terms "cement composition" and "cement product" are equivalent.

These cement compositions comprise a plurality of calcium silicate cement particles and an additive. The calcium silicate cement of the invention is carbonatable and preferably comprises CaO and $SiO_2$ in a CaO to $SiO_2$ percentage by weight of oxides ratio of from about 0.7 to 1.8, more preferably 0.7 to 1.5, even more preferably of 0.8 to 1.2. In an embodiment, the calcium silicate cement of the invention comprises from 30 to 55% wt. $SiO_2$; from 40 to 55% wt. CaO relative to the total weight of oxide and optionally further comprises from 1 to 8% wt. $Al_2O_3$; from 0.1 to 5% wt. $Fe_2O_3$; and/or from 0.1 to 2.5% wt. MgO relative to the total weight of oxide. The calcium silicate cement of the invention may optionally further comprise from 0.01 to 10% wt. $SO_3$; from 0.01 to 0.5% wt. $Na_2O$; from 0.0.1 to 2% wt. $K_2O$; from 0.01 to 0.5% wt. $TiO_2$; from 0.01 to 1% wt. $P_2O_5$; and/or from 0.01 to 0.5% wt. $Mn_2O_3$ relative to the total weight of oxide.

In another aspect, the invention relates to the calcium silicate-based concrete compositions. The concrete compositions comprise a plurality of carbonatable calcium silicate cement particles, a plurality of aggregate particles and an additive.

In another aspect, the cement of the invention enables to produce a concrete product comprising:
  the cement product of the invention, wherein the cement product is cured with a greenhouse gas comprising carbon dioxide to produce a structure comprising of a core, wherein the core comprises of a portion of the unreacted calcium silicate particle;
  a silica-rich layer covering at least a portion of the surface of the core; and
  an exterior layer covering at least a portion of the silica-rich first layer, wherein, the exterior layer comprises calcium carbonate.

In another aspect, the cement of the composition is non-hydraulic.

In yet another aspect, the invention relates to a method to improve durability of calcium silicate-based materials that has the following steps:
  1. An additive is added prior, during or after the grinding of a calcium silicate-based cement
  2. This calcium silicate-based composition is mixed with a plurality of aggregate particles to form a concrete composition.
  3. The concrete composition has a plurality of pores and is carbonated using a greenhouse gas that contains carbon dioxide.

According to an alternative method to improve durability of calcium silicate-based materials, the following steps are used:
  1. A calcium silicate-based cement is mixed with a plurality of aggregate particles to form a concrete composition;
  2. An additive in powder or liquid form are added prior or during the mixing of the cement and the plurality of aggregate particle;
  3. The resulting concrete composition has a plurality of pores and is carbonated using a greenhouse gas that contains carbon dioxide.

In another aspect, the invention relates to a method for preparing a concrete product.

The invention also provides a concrete product comprising:
  the cement product of the invention, wherein the cement product is cured with a greenhouse gas comprising carbon dioxide to produce a structure comprising of a core, wherein the core comprises of a portion of the unreacted calcium silicate particle;
  a silica-rich layer covering at least a portion of the surface of the core; and
  an exterior layer covering at least a portion of the silica-rich first layer, wherein, the exterior layer comprises calcium carbonate;
  and a plurality of aggregate particles.

The invention also provides a method for preparing a concrete product comprising:
  mixing the cement according to the invention with a plurality of aggregate particles to form a concrete product having a plurality of pores.
  placing and forming the concrete product in molds;
  curing the formed concrete product with a greenhouse gas comprising carbon dioxide to produce a structure comprising of a core, wherein the core comprises of a portion of the unreacted carbonatable calcium silicate particle;
  a silica-rich layer covering at least a portion of the surface of the core; and
  an exterior layer covering at least a portion of the silica-rich first layer, wherein, the exterior layer comprises calcium carbonate;

In another aspect, the invention relates to a carbonatable composition comprising:
  calcium silicate;
  one or more discrete calcium silicate phases selected from CS (wollastonite or pseudowollastonite), C3S2 (rankinite), C2S (belite, larnite, bredigite), and an amorphous calcium silicate phase at about 30%> or more by mass of the total phases; and
  calcium aluminate accounting for about 0.1% to about 2.5% by weight of the carbonatable composition,
  wherein elemental Ca and elemental Si are present in the composition at a molar ratio from about 0.8 to about 1.2; and metal oxides of Al, Fe and Mg are present in the composition at about 30% or less by mass,
  the additive, preferably calcium stearate.

Precast Objects of Carbonatable Calcium Silicate Cements

The term "calcium silicate" material, as used herein, generally refers to naturally-occurring minerals or synthetic materials that are comprised of one or more of a group of calcium silicate phases. "Carbonatable", as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. Exemplary carbonatable calcium silicate phases include CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO.SiO_2$). Amorphous phases can also be carbonatable depending on their composition. Each of these materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. Exemplary uncarbonatable or inert phases include melilite $((Ca,Na,K)_2[(Mg, Fe^{2+},Fe^{3+},Al,SO_3O_7])$ and crystalline silica ($SiO_2$).

The carbonatable calcium silicate phases included in the calcium silicate composition do not hydrate when exposed to water. Due to this, composites produced using a calcium silicate composition as the binding agent do not generate significant strength when combined with water. The strength generation is controlled by exposure of calcium silicate composition containing composites to specific curing regimes in the presence of $CO_2$.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In exemplary embodiments, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 1 μm to about 5 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 m²/kg to about 700 m²/kg (e.g., 150 m²/kg, 200 m²/kg, 250 m²/kg, 300 m²/kg, 350 m²/kg, 400 m²/kg, 450 m²/kg, 500 m²/kg, 550 m²/kg, 600 m²/kg, 650 m²/kg, 700 m²/kg).

In exemplary embodiments of carbonation of the calcium silicate composition of the invention, ground calcium silicate particles used have a particle size having a cumulative 10% diameter greater than 1 μm in the volume distribution of the particle size distribution.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

Carbonation of Carbonatable Calcium Silicate Cements

A major utility of the carbonatable composition is that it can be carbonated to form composite materials that are useful in a variety of application.

The following reactions are believed to take place during carbonation of calcium silicate as disclosed herein.

$$CaSiO_3(s)+CO_2(g)\rightarrow CaCO_3(s)+SiO_2(s) \tag{1}$$

$$Ca_3Si_2O_7(s)+3CO_2(g)\rightarrow 3CaCO_3(s)+2SiO_2(s) \tag{2}$$

$$Ca_2SiO_4(s)+2CO_2(g)\rightarrow 2CaCO_3(s)+SiO_2(s) \tag{3}$$

Generally, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The $CaCO_3$ produced from these or any other $CO_2$ carbonation reactions disclosed herein may exist as one or more of several $CaCO_3$ polymorphs (e.g., calcite, aragonite, and vaterite). The $CaCO_3$ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of $CO_2$ may be used depending on the desired outcome of carbonation. For example, industrial grade $CO_2$ at about 99% purity may be used, which is commercially available from a variety of different industrial gas companies, such as Praxair, Inc., Linde AG, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

The carbonation, for example, may be carried out reacting it with $CO_2$ via a controlled Hydrothermal Liquid Phase Sintering (HLPS) process to create bonding elements that hold together the various components of the composite material. For example, in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295, 402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074, 692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. application Ser. No. 15/609,908, filed May 31, 2017, U.S. application Ser. No. 15/716,392, filed Sep. 26, 2017, each of which is expressly incorporated herein by reference in its entirety for all purposes.

Bonding Elements

The carbonation process produces a carbonated composite material that microscopically includes a plurality of bonding elements having one or more types of microstructure. Collectively, the plurality of bonding elements forms an inter-connected bonding matrix creating bonding strength and holding the composite material. For example, the microstructured bonding elements may be: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles.

The silica rich rim generally displays a varying thickness within a bonding element and from bonding element to bonding element, typically ranging from about 0.01 μm to about 50 μm. In certain preferred embodiments, the silica rich rim has a thickness ranging from about 1 μm to about 25 μm. As used herein, "silica rich" generally refers to a silica content that is significant among the components of a material, for example, silica being greater than about 50% by volume. The remainder of the silica rich rim is comprised largely of $CaCO_3$, for example 10% to about 50% of $CaCO_3$ by volume. The silica rich rim may also include inert or unreacted particles, for example 10% to about 50% of melilite by volume. A silica rich rim generally displays a transition from being primarily silica to being primarily $CaCO_3$. The silica and $CaCO_3$ may be present as intermixed or discrete areas.

The silica rich rim is also characterized by a varying silica content from bonding element to bonding element, typically ranging from about 50% to about 90% by volume (e.g., from about 60% to about 80%). In certain embodiments, the silica rich rim is generally characterized by a silica content ranging from about 50% to about 90% by volume and a $CaCO_3$ content ranging from about 10% to about 50% by volume. In certain embodiments, the silica rich rim is characterized by a silica content ranging from about 70% to about 90% by volume and a $CaCO_3$ content ranging from about 10% to about 30% by volume. In certain embodiments, the silica rich rim is characterized by a silica content ranging from about 50% to about 70% by volume and a $CaCO_3$ content ranging from about 30% to about 50% by volume.

The silica rich rim may surround the core to various degrees of coverage anywhere from about 1% to about 99% (e.g., about 10% to about 90%). In certain embodiments, the silica rich rim surrounds the core with a degree of coverage less than about 10%. In certain embodiments, the silica rich rim of varying thickness surrounds the core with a degree of coverage greater than about 90%.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

The plurality of bonding elements may have any suitable mean particle size and size distribution dependent on the desired properties and performance characteristics of the composite product. In certain embodiments, for example, the plurality of bonding elements have a mean particle size in the range of about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

The inter-connected network of bonding elements (a bonding matrix) may also include a plurality of coarse or fine filler particles that may be of any suitable material, have any suitable particle size and size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

The weight ratio of bonding elements to filler particles may be any suitable ratios dependent on the intended application for the composite material product. For example, the weight ratio of bonding elements to filler particles may be in the range from about (50 to 99):about (1 to 50), e.g., from about (60 to 99):about (1 to 40), from about (80 to 99):about (1 to 20), from about (90 to 99):about (1 to 10), from about (50 to 90):about (10 to 50), from about (50 to 70):about (30 to 50). In certain embodiments depending on the application, the weight ratio of bonding elements to filler particles may be in the range from about (10 to 50):about (50 to 90), e.g., from about (30 to 50):about (50 to 70), from about (40 to 50):about (50 to 60).

Additional background discussions and examples of curing systems and related topics may be found in U.S. Pat. No. 9,221,027, U.S. Pub. No. 2015/0225295 (application Ser. No. 14/602,313), U.S. Pub. No. 2015/0336852 (application Ser. No. 14/818,629), U.S. Pub. No. 2017/0102373 (application Ser. No. 15/290,328), each of which is expressly incorporated herein by reference in its entirety for all purposes.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

Compositions and Method to Improve the Durability of Calcium Silicate-Based Cements and Concretes The invention provides novel compositions of carbonatable calcium silicate-based cements and concretes and methods for improving durability of calcium silicate-based cements and concretes.

In another aspect, the cement of the invention enables to produce a concrete product comprising:
  the cement product of the invention, wherein the cement product is cured with a greenhouse gas comprising carbon dioxide to produce a structure comprising of a core, wherein the core comprises of a portion of the unreacted calcium silicate particle;
  a silica-rich layer covering at least a portion of the surface of the core; and
  an exterior layer covering at least a portion of the silica-rich first layer, wherein the exterior layer comprises calcium carbonate.

In another aspect, the cement of the composition is non-hydraulic.

These improvements are achieved through the use of specific additives, included during the preparation of the cement or the concrete compositions.

Preferably, the cement compositions comprise a plurality of carbonatable calcium silicate cement particles and an additive which is a hydrophobic organic acid, or a salt thereof, or a silane, or a polysiloxane.

The hydrophobic compound is in the form of powder, emulsion or liquid.

Preferably, the hydrophobic organic acid, or a salt thereof, is one or more fatty acid(s), or one or more salt(s) thereof, advantageously one or more alkali or alkali-earth metal salt(s) thereof, more advantageously a calcium or sodium salt(s) thereof.

The fatty acid according to this invention is a carboxylic acid with a long aliphatic chain, which is either saturated or unsaturated, preferably is saturated. Preferably, the long aliphatic chain has carbon atoms from 4 to 35, even more preferably from 5 to 28 carbon atoms.

Advantageously, the long aliphatic chain has carbon atoms from 10 to 35, more advantageously from 10 to 28 carbon atoms, even more advantageously from 10 to 20 carbon atoms and may be either saturated or unsaturated, preferably is saturated.

Advantageously, the long aliphatic chain has 10, 11, 12, 13, 14, 15, 16, 17, 18, 19 or 20 carbon atoms and may be either saturated or unsaturated, preferably is saturated.

Preferably, the fatty acid, or a salt thereof, is selected from the group consisting of a valeric acid, or a salt thereof, a stearic acid, or a salt thereof; an oleic acid, or a salt thereof; an arachidic acid, or a salt thereof; a palmitic acid, or a salt thereof; an arachidonic acid, or a salt thereof; an erucic acid, or a salt thereof; a linoleic acid, or a salt thereof; a linolenic acid, or a salt thereof and a lauric acid, or a salt thereof or a combination thereof.

More advantageously, the fatty acid, or a salt thereof, is selected from the group consisting of lauric acid, or a salt thereof; stearic acid, or a salt thereof; oleic acid, or a salt thereof; or a combination thereof.

Preferably, the fatty acid is stearic acid or a salt thereof.

More preferably, a salt of the fatty acid is a calcium stearate.

As an alternative, a salt of the fatty acid is a sodium oleate.

Preferably, the quantity of the additive in the cement compositions of the invention is comprised between 0.1 wt. % and 2.0 wt. % of the amount of cement.

Advantageously, the quantity of the additive in the cement compositions of the invention is comprised between 0.1 wt. % and 0.3 wt. % of the amount of cement; 0.1 wt. % and 0.5 wt. % of the amount of cement; 0.1 wt. % and 1.0 wt. % of the amount of cement; 0.1 wt. % and 1.5 wt. % of the amount of cement; 0.2 wt. % and 0.5 wt. % of the amount of cement; 0.5 wt. % and 1.5 wt. % of the amount of cement; or 1.0 wt. % and 2.0 wt. % of the amount of cement.

In another aspect, the invention relates to a method to increase durability of calcium silicate-based materials comprising the addition of the additive during or after the grinding of a calcium silicate-based cement or during the mixing of the cement with a plurality of aggregate particles to form a concrete composition.

In one embodiment, this method to increase durability of calcium silicate-based materials has the following steps:
1. the additive is added prior, during or after the grinding of a calcium silicate-based cement;
2. this calcium silicate-based composition is mixed with a plurality of aggregate particles to form a concrete composition;
3. the concrete composition has a plurality of pores and is carbonated using a greenhouse gas that contains carbon dioxide.

Preferably, this method to increase durability of calcium silicate-based materials has the following steps:
1. calcium stearate is added prior, during or after the grinding of a calcium silicate-based cement;
2. this calcium silicate-based composition is mixed with a plurality of aggregate particles to form a concrete composition;
3. the concrete composition has a plurality of pores and is carbonated using a greenhouse gas that contains carbon dioxide.

Preferably, the quantity of calcium stearate in the first step is comprised between 0.1 wt. % and 2.0 wt. % of the amount of cement.

In another embodiment, this method to increase durability of calcium silicate-based materials, has the following steps:
1. a calcium silicate-based cement is mixed with a plurality of aggregate particles to form a concrete composition;
2. the additive is added prior or during the mixing of the cement and the plurality of aggregate particles;
3. the resulting concrete composition has a plurality of pores and are carbonated using a greenhouse gas that contains carbon dioxide.

Preferably, the quantity of additive in second step is comprised between 0.1 wt. % and 2.0 wt. % of the amount of cement.

Preferably, this embodiment of a method to increase strength of calcium silicate-based materials has the following steps:
1. a calcium silicate-based cement is mixed with a plurality of aggregate particles to form a concrete composition;
2. calcium stearate is added prior or during the mixing of the cement and the plurality of aggregate particle;
3. the resulting concrete composition has a plurality of pores and are carbonated using a greenhouse gas that contains carbon dioxide.

Preferably, the quantity of calcium stearate in the second step is comprised between 0.1 wt. % and 2.0 wt. % of the amount of cement.

The invention also provides a concrete product comprising:
the cement product of the invention, wherein the cement product is cured with a greenhouse gas comprising carbon dioxide to produce a structure comprising of a core, wherein the core comprises of a portion of the unreacted calcium silicate particle;
a silica-rich layer covering at least a portion of the surface of the core; and
an exterior layer covering at least a portion of the silica-rich first layer, wherein, the exterior layer comprises calcium carbonate;
and a plurality of aggregate particles.

The invention also provides a method for preparing a concrete product comprising:
mixing the cement according to the invention with a plurality of aggregate particles to form a concrete product having a plurality of pores;
placing and forming the concrete product in molds;
curing the formed concrete product with a greenhouse gas comprising carbon dioxide to produce a structure comprising of a core, wherein the core comprises of a portion of the unreacted carbonatable calcium silicate particle;
a silica-rich layer covering at least a portion of the surface of the core; and
an exterior layer covering at least a portion of the silica-rich first layer, wherein, the exterior layer comprises calcium carbonate.

The invention also provides a carbonatable composition comprising:
calcium silicate;
one or more discrete calcium silicate phases selected from CS (wollastonite or pseudowollastonite), C3S2 (rankinite), C2S (belite, larnite, bredigite), and an amorphous calcium silicate phase at about 30%> or more by mass of the total phases; and calcium aluminate accounting for about 0.1% to about 2.5% by weight of the carbonatable composition, wherein elemental Ca and elemental Si are present in the composition at a molar ratio from about 0.8 to about 1.2; and metal oxides of Al, Fe and Mg are present in the composition at about 30% or less by mass;

the additive which is a hydrophobic organic acid, or a salt thereof, or a silane, or a polysiloxane, preferably a fatty acid or a salt thereof, even more preferably oleate, laureate, stearate, sodium stearate or calcium stearate.

Preferably, the carbonatable composition of the invention is suitable for carbonation with $CO_2$ at a temperature of about 30° C. to about 90° C. to form $CaCO_3$ with a mass gain of about 10% or more.

EXAMPLES

Carbonatable Calcium Silicate-Based Cement Compositions

In the following examples, two cements are used: Cement 1 and Cement 2. Their chemical compositions are in the ranges provided in the table below.

|  | Range of compositions |
|---|---|
| LOI (%) | 0 to 2 |
| $SiO_2$ (%) | 30 to 55 |
| $Al_2O_3$ (%) | 1 to 8 |
| $Fe_2O_3$ (%) | 0.1 to 5 |
| CaO (%) | 40 to 55 |
| MgO (%) | 0.1 to 2.5 |
| $SO_3$ (%) | 0.01 to 10 |
| $Na_2O$ (%) | 0.01 to 0.5 |
| $K_2O$ (%) | 0.1 to 2 |
| $TiO_2$ (%) | 0.01 to 0.5 |
| $P_2O_5$ (%) | 0.01 to 1 |
| $Mn_2O_3$ (%) | 0.01 to 0.5 |

Example 1: Freeze-Thaw Resistance

Freeze-thaw scaling is tested according to standard ASTM C1645/C1645M with a temperature cycle according to NF EN 1338 on a 4×4×16 $cm^3$ concrete sample.

Performance Indicators of Freeze-Thaw Resistance

The resistance to freeze-thaw degradation is described by the cumulative loss of dry mass of scales after 28 cycles. This indicator is referred to as scaling. The volumes of pores filled with water after 72 h of immersion of dry samples is defined as the initial liquid saturation.

Concrete Compositions Used for Freeze-Thaw Resistance

The following 4×4×16 vibrated mortars, with no additional compaction, range of compositions is used to assess Freeze thaw scaling performance.

| | Cement | Water | Siliceous Filler | EN Sand | Calcium stearate |
|---|---|---|---|---|---|
| ID | Type | [g] | [g] | [g] | [g] |
| A | Cement 1 | 270 | 140 | 165 | 1350 | 0 or 2.9 |
| B | Cement 1 | 270 | 180 | 165 | 1350 | 0 or 2.9 |
| C | Cement 2 | 270 | 140 | 165 | 1350 | 0 or 2.9 |
| D | Cement 2 | 270 | 180 | 165 | 1350 | 0 or 2.9 |

The concrete compositions were prepared in a Perrier mixer, and cast in 4×4×16 cm molds, using a vibrating table. The mixing procedure was the following:

1. Mixing of all the solid components with the sand during 1 min at slow speed
2. Adding water during 30 seconds
3. Mixing another 1 min at slow speed
4. Stopping the mixing and scraping of the material on the side of the mixing bowl for 1 minute
5. Mixing at slow speed for 30 seconds
6. Mixing at fast speed for another 30 seconds Calcium stearate was dispersed in the water, and the samples were vibrated 2 minutes in the molds.

Before carbonation the samples are dried a 20° C. and 95% relative humidity down to a water content of 1 to 3 wt %. The samples are then carbonated for 48 h at 70° C.

Results of Freeze-Thaw Resistance

For most samples not treated with stearate salts, the initial liquid saturation ranges from 0.3 to 0.55 and the scaling is of at least 5 $kg/m^2$.

For most samples treated with calcium stearate at 0.5 wt. % of cement [1]$_{[42]}$, the initial liquid saturation after three days of water imbibition remains below 0.3 and the scaling is lower than 1 $kg/m^2$ after 28 cycles.

Therefore, upon the addition of calcium stearate, the imbibition of water is significantly reduced (by a factor of 2), the scaling is significantly reduced (by a factor 5), and the scaling is below the threshold of 1 kg/m2 as specified in the standard NF EN 1338.

| | Without Calcium Stearate | | With Calcium Stearate | |
|---|---|---|---|---|
| ID | Absorption [Vol. %] | Scaling [$kg/m^2$] | Absorption [Vol. %] | Scaling [$kg/m^2$] |
| A | 63 | >2 | 46 | 0.165 |
| B | 65 | >2 | 31 | 0.461 |
| C | 60 | >2 | 58 | 0.134 |
| D | 57 | >2 | 39 | 0.025 |

Example 2: Water Ingress Testing in Mortar Specimens

Water ingress is a major contributor to the deterioration of concrete and can severely impact service life and performance. Fatty acids, salts of fatty acids, and silanes can be used in carbonatable concrete to limit the ingress of water and salts resulting in improved durability.

In order to evaluate the impact of fatty acids, salts of fatty acids, and silanes on durability and performance, carbonated mortar specimens were prepared according to raw material proportions specified in the tables below and evaluated for water sorptivity as specified in ASTM C1585. Samples were submerged in 2±1 mm of water, and the mass of water uptake was measured over the course of 96 hours.

Each mortar was mixed for 4 min using a Hobart mixer and compacted into 100×60 mm cylindrical moulds using a 2 kg press head. Fatty acids, salts of fatty acids, or silanes were added at the time of mixing following the addition of water and dosed by percent weight of cement (% bwoc).

Carbonatable Mortar Mix Proportions:

| Mix Components | Type | Material Proportions |
|---|---|---|
| Binder | Cement 1 | 362 g |
| Fine aggregate | ASTM graded sand | 1500 g |
| w/c ratio | | 0.35 |

Description of Additives:

| Additive | Type (C:D) | Dosage, % bwoc |
|---|---|---|
| Valeric acid | Short-chain fatty acid (5:0) | 0.25% |
| Lauric acid | Medium-chain fatty acid (12:0) | 0.25% |
| Oleic acid | Long-chain fatty acid (18:1) | 0.25% |
| Stearic acid | Long-chain fatty acid (18:0) | 0.25% |
| Na-oleate | Sodium salt of oleic acid | 1.00% |
| Ca-stearate | Calcium salt of stearic acid | 1.00% |
| Silane A | Proprietary | 0.25% |
| Silane B | Proprietary | 0.25% |

"Silane A" refers to an admixture commercialized by ACM Chemistries, Norcross, Ga. that belongs to the Colorscape Family®.

"Silane B" refers to an admixture commercialized by ACM Chemistries, Norcross, Ga. under the product identifier RainBloc® 80.

Figure 2:
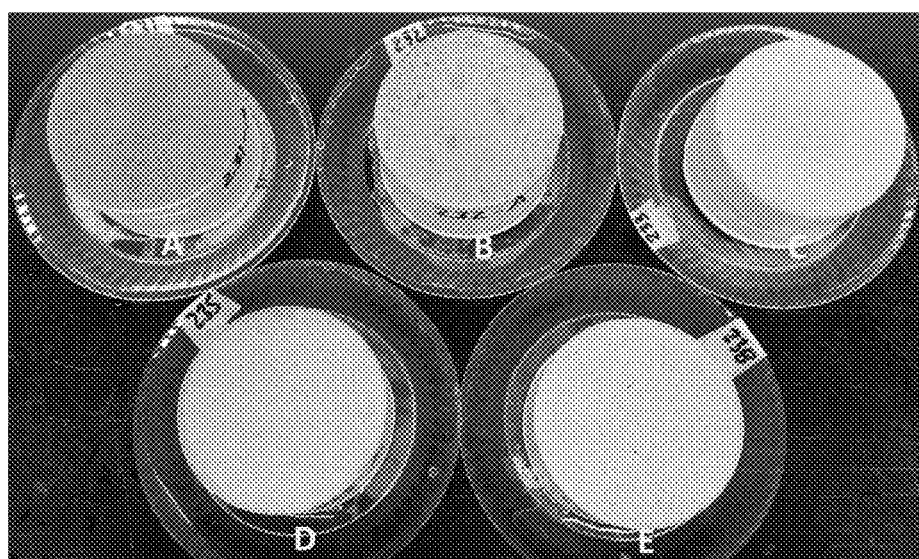
FIG. 2: Mortar specimens shown at the end of water absorption testing of the control (A), specimens of the invention containing (B) valeric acid 0.25 wt. %, (C) lauric acid 0.25 wt. %, (D) oleic acid 0.25 wt. %, and (E) stearic acid 0.25 wt. %. (Example 2). Relative to the control, all specimens of the invention containing fatty acids exhibit reduced rate and total absorption of water.

FIG. 1 shows water sorptivity measurements for carbonatable mortar mixes containing fatty acids representative of short carbon chain lengths (valeric acid, 5:0), medium chain lengths (lauric acid, 12:0), and saturated (stearic acid, 18:0) or unsaturated (oleic acid, 18:1) long chain lengths. All mixes produced with fatty acids reduced the rate of water absorption relative to the control mix Example specimens of each mix are shown in FIG. 2 after sorptivity testing. Relative to the control (A), specimens containing (B) valeric acid 0.25%, (C) lauric acid 0.25%, (D) oleic acid 0.25%, and (E) stearic acid 0.25% exhibit reduced rate and total absorption of water.

Figure 3:
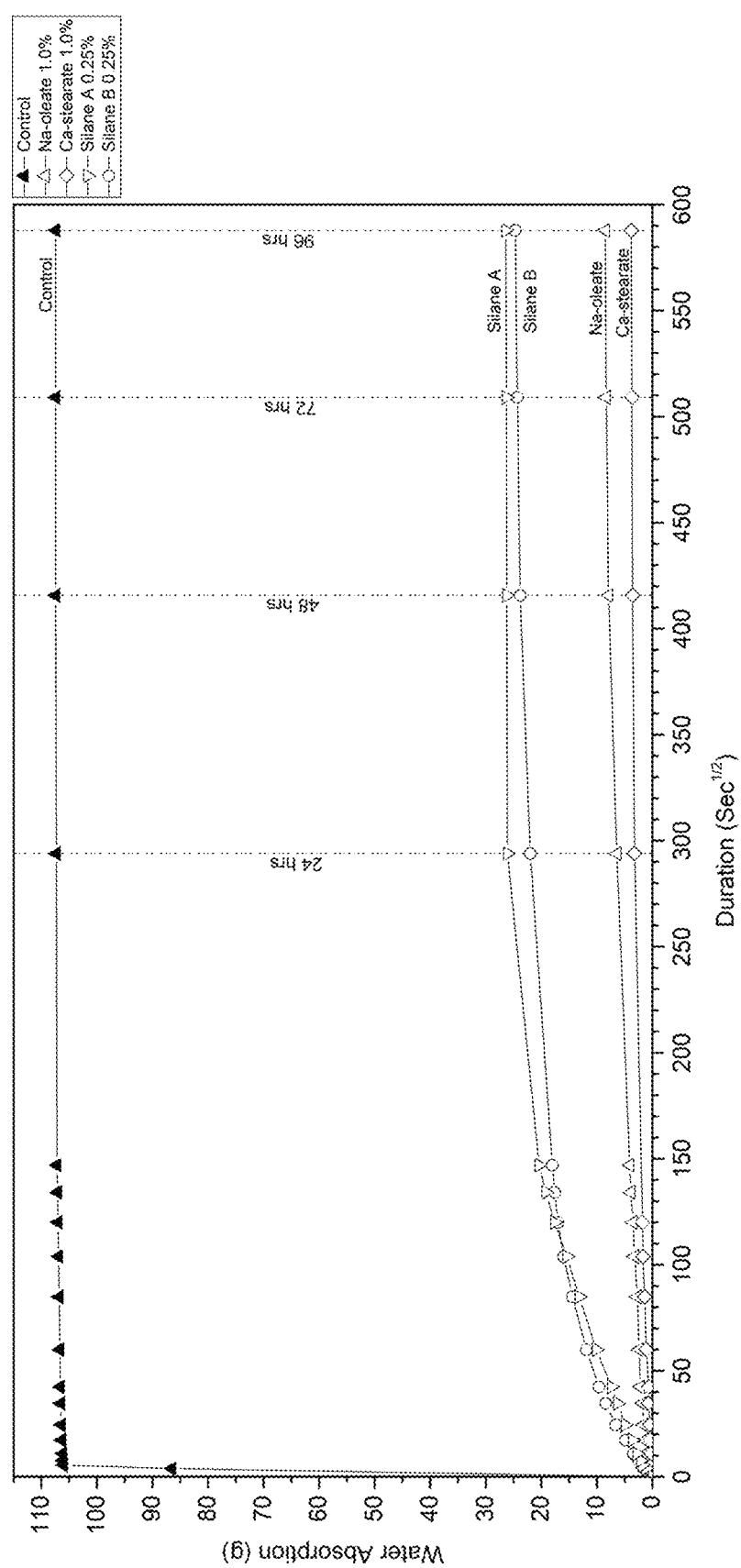
FIG. 3: Water absorption of mortar mixes containing no additive (Control; ), salts of fatty acids (invention, Na-Oleate 1 wt. % ; or Ca stearate 1.0 wt. %; ) or proprietary silanes (Silane A 0.25 wt. %; or Silane B 0.25 wt. %; ) (Example 2) Both the salts of fatty acids and the silanes reduced the rate and total absorption of water relative to the control mix.

Water sorptivity measurements for mortar mixes containing representative salts of fatty acids and silanes are shown in FIG. 3. Both the salts of fatty acids and the silanes reduced the rate and total absorption of water relative to the control mix.

Figure 4:
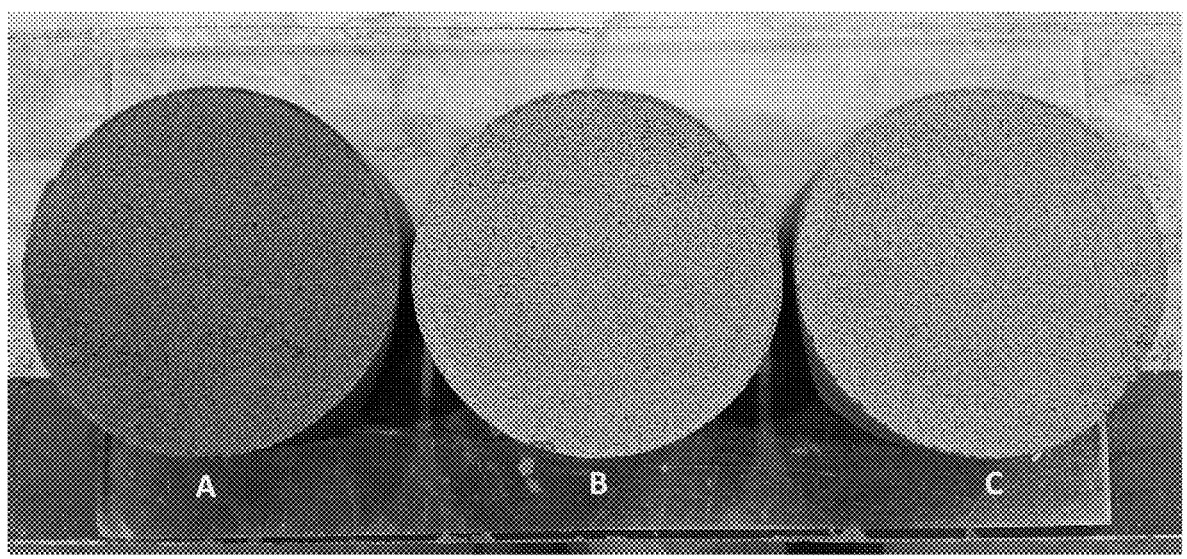
FIG. 4: Mortar specimens shown at the end of water absorption of the control (A) specimen, and of specimens of the invention containing (B) Na-oleate 1.0% and (C) Ca-stearate 1.0% (Example 2). Relative to the (A) control, specimens of the invention containing (B) Na-oleate 1.0% and (C) Ca-stearate 1.0% exhibit reduced rate and total absorption of water.
Figure 5:
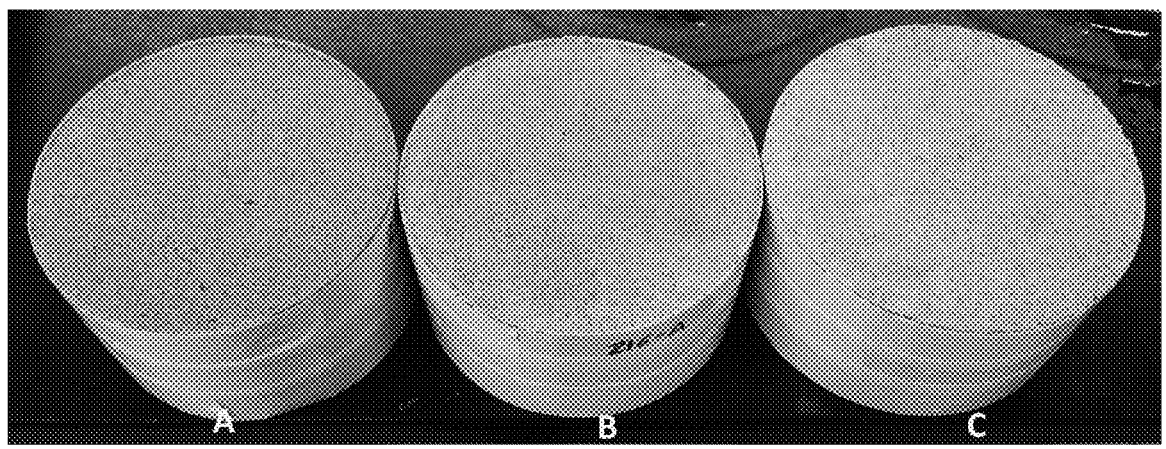
FIG. 5: Mortar specimens shown at the end of water absorption testing both with and without the addition of silanes. (Example 2). Relative to the (A) control, specimens of the invention containing (B) Silane A and specimens of the invention containing (C) Silane B exhibit reduced rate and total absorption of water.

Example specimens of each mix are shown in FIGS. 4 and 5 after sorptivity testing. In FIG. 4, relative to the control mix (A), specimens containing (B) Na-oleate at 1.0% and (C) Ca-stearate 1.0% exhibit a reduced rate and total absorption of water. In FIG. 5, mortar specimens are shown at the end of water absorption testing both with and without the addition of silanes. Relative to the (A) control, specimens containing (B) Silane A and specimens containing (C) Silane B exhibit reduced rate and total absorption of water.

Example 3: Water Ingress Testing in Concrete Specimens

Concrete pavers were produced using carbonatable cement and raw materials supplied by two industrial concrete producers. Mix proportions are specified in the table below. Ca-stearate was added to the experimental batches during mixing with dosages ranging from 0.3 to 1.5 percent by weight of cement.

Pavers were tested for water absorption following procedures as specified in ASTM C140 Standard Test Methods for Sampling and Testing Concrete Masonry Units and Related Units. In this test method, samples are immersed for 24 hours with no less than 6 in. (152 mm) of water above the surface of the specimen. Following immersion in water, samples are oven-dried at 100 to 115° C. until two successive weighings at intervals of 2 hours show an increment of loss no greater than 0.2% of the last previously determined weight.

In addition to testing for water absorption, concrete pavers produced with and without Ca-stearate were installed according to industry specifications and evaluated for performance during service through wetting and drying cycles.

The durability of pavers produced with the addition of Ca-stearate was evaluated in comparison to reference concrete pavers with freeze-thaw testing in 3% saline solution following procedures as specified in CSA A231.2.

Carbonatable Concrete Mix Designs:

| Mix Component | Concrete Mix A | Concrete Mix B |
|---|---|---|
| Cement 1 | 14.5% | 17.0% |
| Fine aggregate | 42.4% | 72.0% |
| Coarse aggregate I | 12.9% | 10.6% |
| Coarse aggregate II | 14.5% | — |
| Coarse aggregate III | 3.15% | — |
| Coarse aggregate IV | 12.4% | — |
| Pigment | 0.15% | 0.37% |

Figure 6:
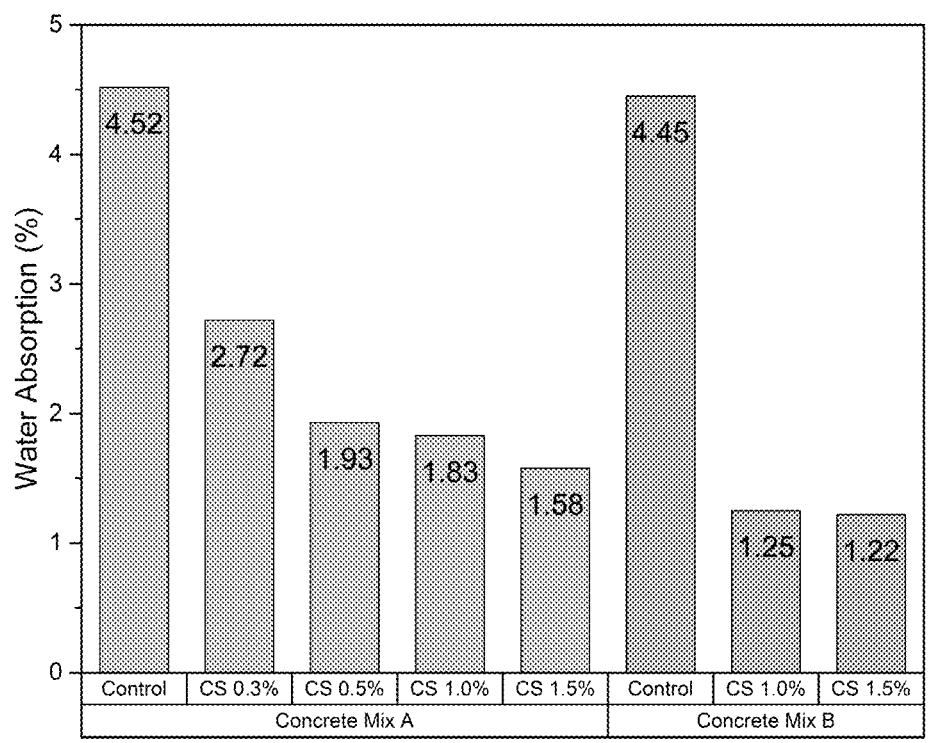
FIG. 6: Average water absorption of two different raw material concrete mixes A (left) and B (right) produced with (invention) and without (control) calcium stearate (CS) dosed by percent weight of cement. (Example 3). At each of the tested dosages ranging from 0.3 to 1.5 percent by weight of cement, water absorption was significantly reduced in comparison to the control batches.

Average water absorption percentages of carbonatable concrete pavers produced without Ca-stearate (Control) and with Ca-stearate (CS) are shown in FIG. 6. At each of the tested dosages ranging from 0.3 to 1.5 percent by weight of cement, water absorption was significantly reduced in comparison to the control batches.

Figure 7:
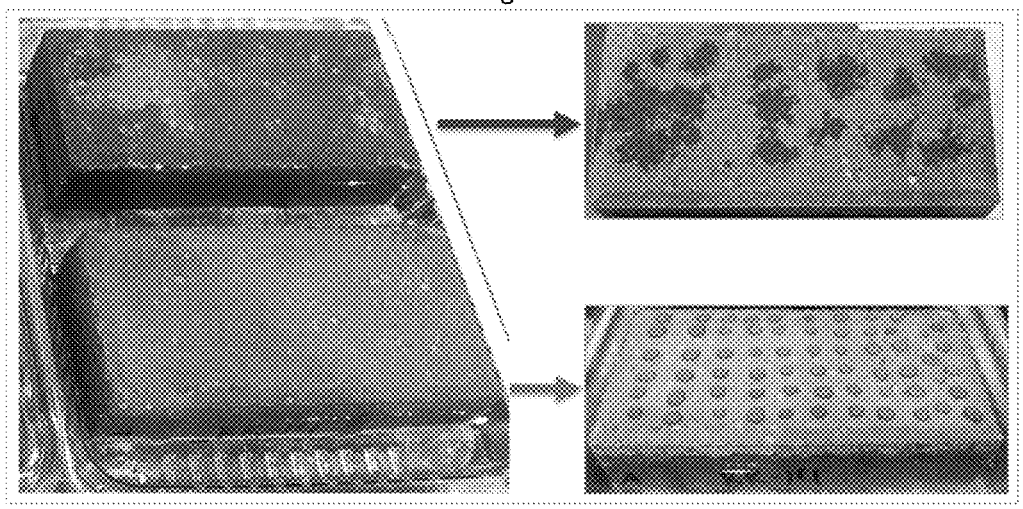
FIG. 7: Comparison between Concrete Mix B without Ca-stearate (top, control) and Concrete Mix B containing 1.0% Ca-stearate (bottom, invention) (Example 3). Pavers produced with Ca-stearate exhibit reduced ingress and permeation of water in comparison to control pavers.
Figure 8:
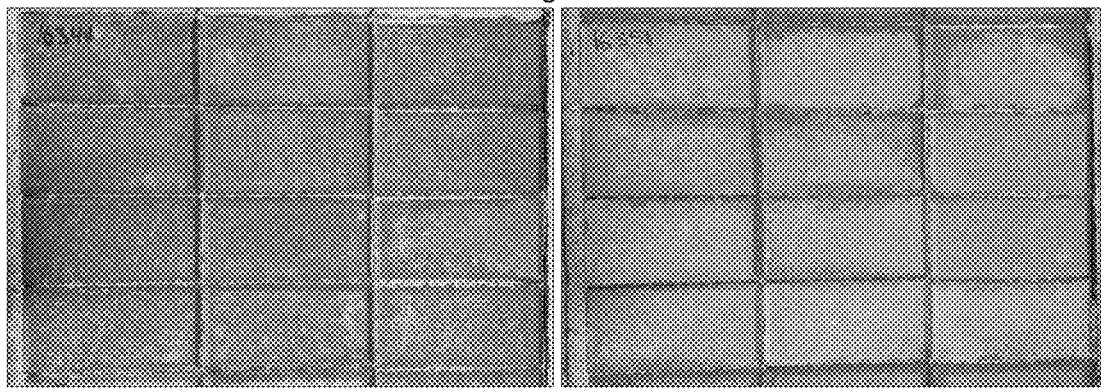
FIG. 8: Comparison between ground installations after rain exposure of pavers containing Concrete Mix A without Ca-stearate (left, control) and Concrete Mix A with 1.0% Ca-stearate (right, invention). (Example 3). Pavers produced with Ca-stearate exhibit reduced ingress and permeation of water in comparison to control pavers.

FIG. 7 is a comparison between Concrete Mix B without Ca-stearate (top) and Concrete Mix B containing 1.0% Ca-stearate (bottom). FIG. 8 is a comparison between ground installations after rain exposure of pavers containing Concrete Mix A without Ca-stearate (left) and Concrete Mix A with 1.0% Ca-stearate (right).

As shown in both FIG. 7 and FIG. 8, pavers produced with Ca-stearate exhibit reduced ingress and permeation of water in comparison to control pavers.

Freeze-thaw performance and durability assessment of concrete pavers in the presence of deicing salt is shown in FIG. 9. Pavers produced with the addition of 1.0% calcium stearate (CS) show significant improvements in durability in comparison to pavers produced without calcium stearate during exposure to deicing salt and freeze-thaw cycling. The control pavers, without the 1% calcium stearate addition, demonstrated a wider distribution in performance. All these control pavers failed to meet the requirements specified in ASTMC1782/CSA231.

The invention claimed is:
1. A non-hydraulic cement comprising:
a plurality of particles of a carbonatable calcium silicate phases, the calcium silicate comprising one or more discrete calcium silicate phase selected from CS (wollastonite or pseudowollastonite), C3S2 (rankinite), C2S (belite, larnite, bredigite), and an amorphous phase at about 30% or more by mass of the total phases; and
a hydrophobic organic acid, or a salt thereof, or a silane, or a polysiloxane.
2. The cement of claim 1, wherein the hydrophobic organic acid, or a salt thereof, is one or more fatty acid(s), or one or more salt(s) thereof.
3. The cement of claim 2, wherein the fatty acid, or a salt thereof, is selected from the group consisting of a valeric acid, or a salt thereof; stearic acid, or a salt thereof; an oleic acid, or a salt thereof; an arachidic acid, or a salt thereof; a palmitic acid, or a salt thereof; an arachidonic acid, or a salt thereof; an erucic acid, or a salt thereof; a linoleic acid, or a salt thereof; a linolenic acid, or a salt thereof and a lauric acid, or a salt thereof or a combination thereof.

4. The cement of claim 3, wherein a salt of the fatty acid is a calcium stearate.

5. A concrete comprising:
the cement of claim 1, wherein the cement product is cured with carbon dioxide to produce a structure comprising of a core, wherein the core comprises of a portion of an unreacted calcium silicate particle;
a silica-rich layer covering at least a portion of the surface of the core; and
an exterior layer covering at least a portion of the silica-rich first layer, wherein, the exterior layer comprises calcium carbonate;
and a plurality of aggregate particles.

6. A method for preparing a concrete product comprising:
mixing the cement of claim 1 with a plurality of aggregate particles to form a concrete product having a plurality of pores;
placing and forming the concrete product in molds;
curing the formed concrete product with carbon dioxide to produce a structure comprising of a core, wherein the core comprises of a portion of an unreacted carbonatable calcium silicate particle;
a silica-rich layer covering at least a portion of the surface of the core; and
an exterior layer covering at least a portion of the silica-rich first layer, wherein, the exterior layer comprises calcium carbonate.

7. A carbonatable composition comprising:
one or more discrete calcium silicate phases selected from CS (wollastonite or pseudowollastonite), C3S2 (rankinite), C2S (belite, larnite, bredigite), and an amorphous calcium silicate phase at about 30% or more by mass of the total phases; and
calcium aluminate accounting for about 0.1% to about 2.5% by weight of the carbonatable composition, wherein elemental Ca and elemental Si are present in the composition at a molar ratio from about 0.8 to about 1.2; and metal oxides of Al, Fe and Mg are present in the composition at about 30% or less by mass, and
a hydrophobic organic acid, or a salt thereof, or a silane, or a polysiloxane.

8. The carbonatable composition of claim 7, wherein the salt is a calcium stearate.

* * * * *